US012548939B2

(12) United States Patent
Huang et al.

(10) Patent No.: US 12,548,939 B2
(45) Date of Patent: Feb. 10, 2026

(54) SEALING ARRANGEMENT FOR A CONNECTOR THAT ACCOMMODATES DIFFERENT DIAMETER CABLES

(71) Applicant: Tyco Electronics Technology (SIP) Ltd., Suzhou (CN)

(72) Inventors: Jianlin Huang, Suzhou (CN); Feng (Carlos) Pan, Suzhou (CN); Minjie Zhu, Suzhou (CN)

(73) Assignee: Tyco Electronics Technology (SIP) Ltd., Suzhou (CN)

( * ) Notice: Subject to any disclaimer, the term of this patent is extended or adjusted under 35 U.S.C. 154(b) by 319 days.

(21) Appl. No.: 18/147,794

(22) Filed: Dec. 29, 2022

(65) Prior Publication Data

US 2023/0216238 A1 Jul. 6, 2023

(30) Foreign Application Priority Data

Dec. 31, 2021 (CN) ........................ 202111659649.0

(51) Int. Cl.
*H01R 13/52* (2006.01)

(52) U.S. Cl.
CPC ................................ *H01R 13/5208* (2013.01)

(58) Field of Classification Search
CPC ............ H01R 13/5208; H01R 13/5221; H01R 13/6592; H01R 13/5205
See application file for complete search history.

(56) References Cited

U.S. PATENT DOCUMENTS

| | | | |
|---|---|---|---|
| 6,113,407 A | 9/2000 | Martin | |
| 7,371,115 B1 | 5/2008 | Hsieh et al. | |
| 9,178,301 B2 | 11/2015 | Shiga | |
| 9,496,667 B2 | 11/2016 | Gardner | |
| 9,577,367 B2 * | 2/2017 | Campbell | H01R 13/5205 |
| 11,527,855 B2 | 12/2022 | Jung et al. | |
| 2015/0155670 A1 | 6/2015 | Gardner | |
| 2015/0295346 A1 | 10/2015 | Campbell et al. | |
| 2019/0393656 A1 | 12/2019 | Wu et al. | |

(Continued)

FOREIGN PATENT DOCUMENTS

| | | |
|---|---|---|
| CN | 103545653 A | 1/2014 |
| CN | 104508912 A | 4/2015 |
| CN | 111313172 A | 6/2020 |

(Continued)

OTHER PUBLICATIONS

Extended European Search Report dated May 17, 2023, corresponding to Application No. 2216949.2-1201, 15 pages.

(Continued)

*Primary Examiner* — Vanessa Girardi
(74) *Attorney, Agent, or Firm* — Barley Snyder

(57) ABSTRACT

A connector sealing assembly includes an outer housing defining a plurality of seal mounting portions. A cable seal of the assembly is mounted on a cable seal mounting portion of the plurality of seal mounting portions. The cable seal is sized and located to form a seal between the outer housing and a cable extending into the outer housing. A housing seal of the assembly is mounted on a housing seal mounting portion of the plurality of seal mounting portions. The housing seal is sized and located to form a seal between the outer housing and a mating housing of a mating connector.

10 Claims, 7 Drawing Sheets

(56) References Cited

U.S. PATENT DOCUMENTS

2020/0194938 A1 * 6/2020 Jung .................. H01R 13/5205

FOREIGN PATENT DOCUMENTS

| | | | |
|---|---|---|---|
| CN | 216672020 | U | 6/2022 |
| FR | 2786033 | A1 | 5/2000 |
| WO | 2007131534 | A1 | 11/2007 |

OTHER PUBLICATIONS

European Patent Office Examination Report dated May 22, 2025, corresponding to Application No. 22 216 949.2-1201, 12 pages.
Chinese Office Action dated Jul. 21, 2025 with English translation, corresponding to Application No. 202111659649.0, 21 pages.

* cited by examiner

SEALING ARRANGEMENT FOR A CONNECTOR THAT ACCOMMODATES DIFFERENT DIAMETER CABLES

CROSS-REFERENCE TO RELATED APPLICATIONS

This application claims the benefit of Chinese Patent Application No. CN 202111659649.0 filed on Dec. 31, 2021 in the State Intellectual Property Office of China, the whole disclosure of which is incorporated herein by reference.

FIELD OF THE INVENTION

The present invention relates to a connector sealing assembly, a connector including the connector sealing assembly, and a connector assembly including the connector.

BACKGROUND

In the prior art, a connector for a laser radar generally includes an outer housing, an inner housing provided in the outer housing, and terminals provided in the inner housing for transmitting signals (e.g., Ethernet signals) and power. In order to realize the waterproof sealing function, it is usually necessary to set a cable seal in the inner housing. The cable seal is then sleeved on the cable for forming a between the cable and the housing. In addition, in order to create the sealing between the outer housing and a mating housing of a mating connector, it is also necessary to provide a housing seal within the outer housing. However, as the cable seal and the housing seal need to be arranged within the inner housing and the outer housing respectively, the structure of the connector is complicated and its volume too large to implement into modern system packaging.

SUMMARY

According to an embodiment of the present disclosure, a connector sealing assembly includes an outer housing defining a plurality of seal mounting portions. A cable seal of the assembly is mounted on a cable seal mounting portion of the plurality of seal mounting portions. The cable seal is sized and located to form a seal between the outer housing and a cable extending into the outer housing. A housing seal of the assembly is mounted on a housing seal mounting portion of the plurality of seal mounting portions. The housing seal is sized and located to form a seal between the outer housing and a mating housing of a mating connector.

BRIEF DESCRIPTION OF THE DRAWINGS

The invention will now be described by way of example with reference to the accompanying Figures, of which.

DETAILED DESCRIPTION OF THE EMBODIMENTS

Figure 1:
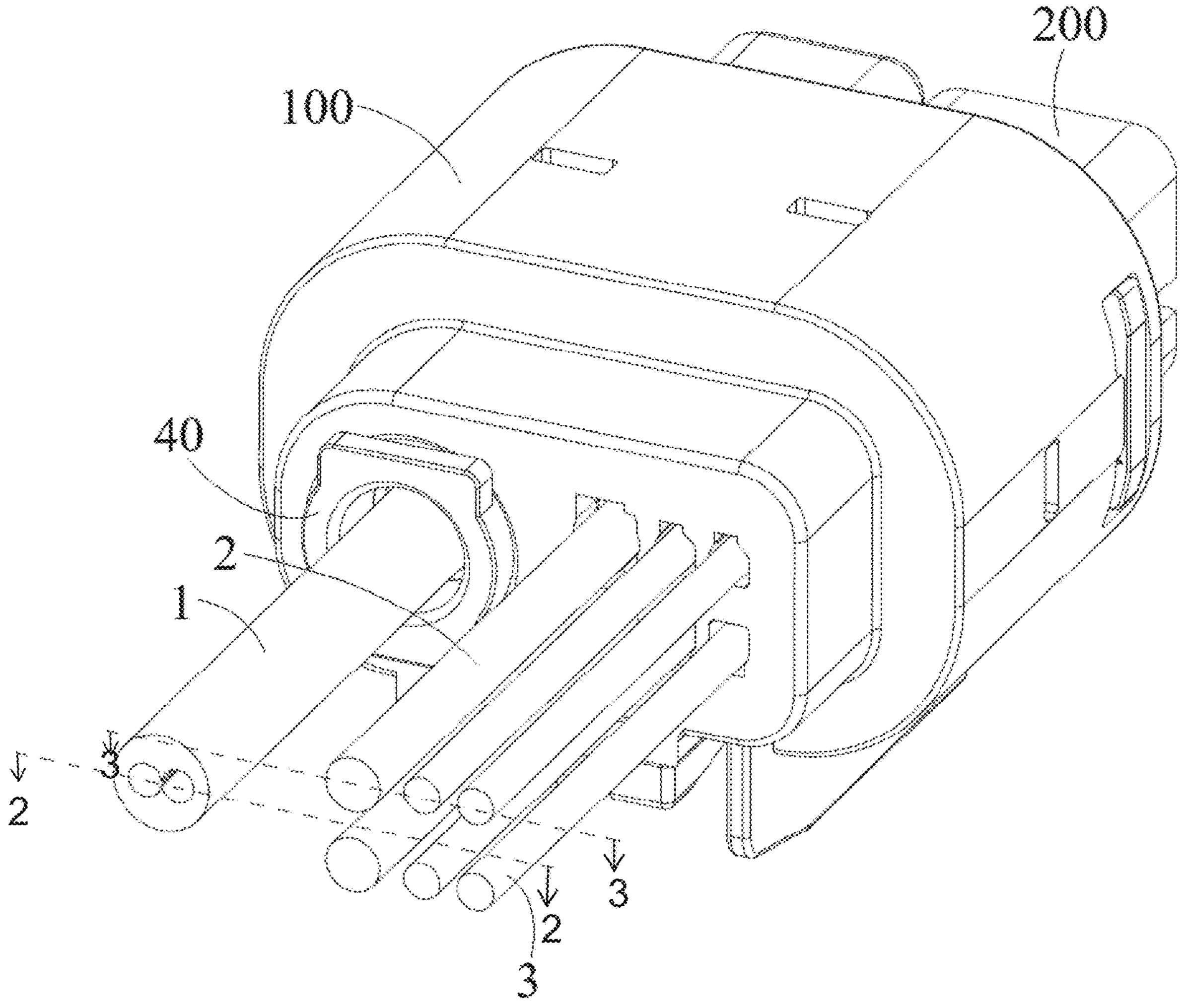
FIG. 1 shows an illustrative perspective view of a connector according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a connector sealing assembly includes an outer housing in which a plurality of seal mounting portions are provided, a cable seal mounted on a cable seal mounting portion of the plurality of seal mounting portions, and a housing seal mounted on a housing seal mounting portion of the plurality of seal mounting portions.

According to another embodiment of the present disclosure, a connector sealing assembly includes an outer housing in which a first accommodation chamber and a second accommodation chamber are formed for installing a first cable seal and a second cable seal, respectively. The outer housing includes an outer peripheral wall in which a chamber is formed for accommodating an inner housing of a connector, an inner peripheral wall radially spaced from the outer peripheral wall to form a third accommodation chamber for accommodating a housing seal, and a radial side wall connected between the outer peripheral wall and the inner peripheral wall. The outer housing is formed to a single integral piece. According to another embodiment of the present disclosure, a connector includes the above connector sealing assembly, and an inner housing at least partially received in the outer housing.

Figure 2:
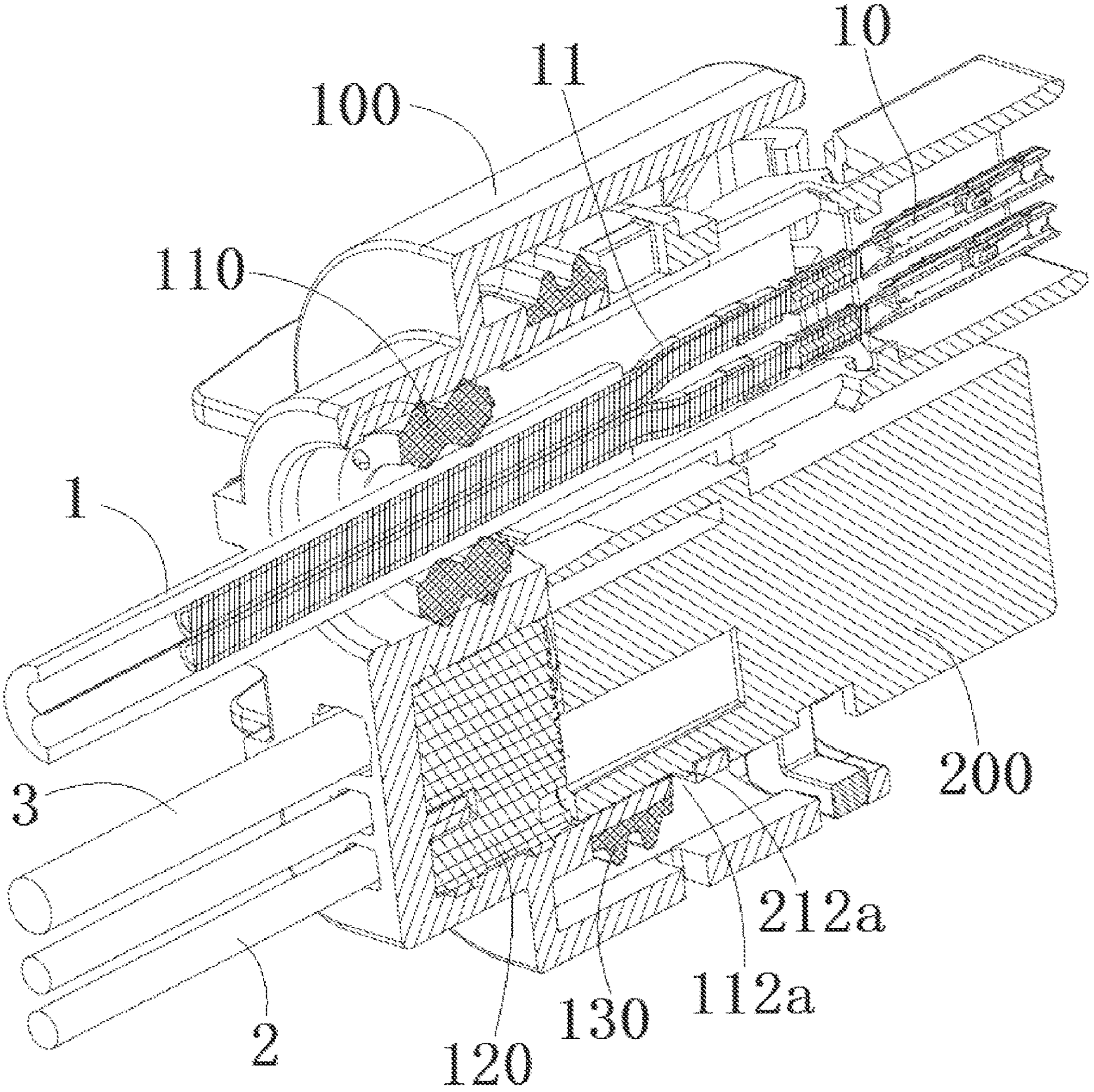
FIG. 2 shows a longitudinal sectional view taken along the line 2-2 of the connector shown in FIG. 1.
Figure 3:
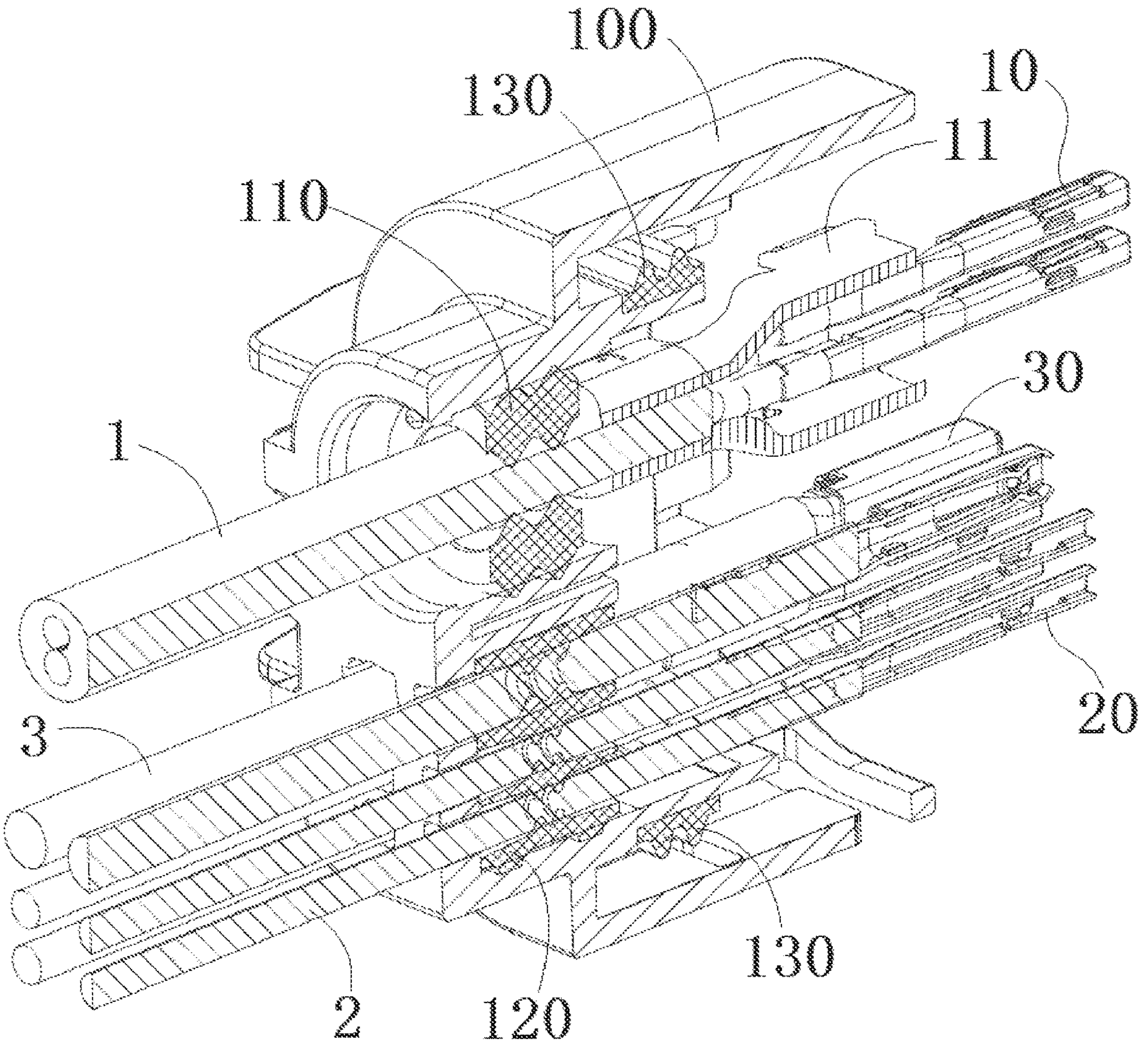
FIG. 3 shows another longitudinal sectional view taken along the line 3-3 of the connector shown in FIG. 1, in which the inner housing is removed.
Figure 4:
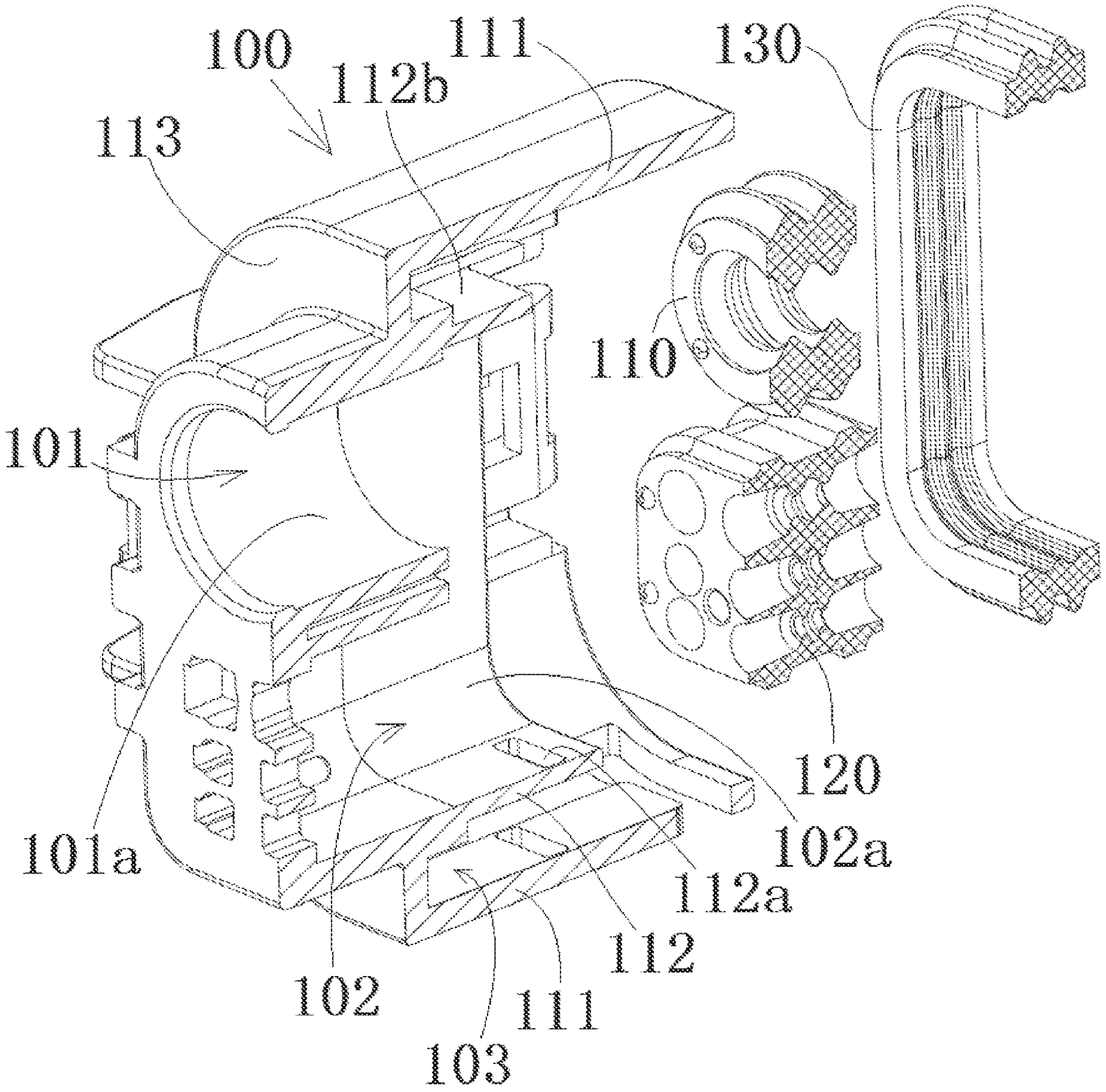
FIG. 4 shows an exploded schematic view taken along the line 3-3 of an outer housing, a cable seal, and a housing seal of the connector shown in FIG. 1.

FIG. 1 shows an illustrative perspective view of a connector according to an exemplary embodiment of the present invention. FIG. 2 shows a longitudinal sectional view of a connector according to an exemplary embodiment of the present invention. FIG. 3 shows another longitudinal cross-sectional view of a connector according to an exemplary embodiment of the present invention with an inner housing 200 removed. FIG. 4 shows an exploded schematic view of an outer housing 100, first and second cable seals 110,120, and a housing seal 130 of the connector according to an exemplary embodiment of the present invention.

Referring to FIGS. 1-4, a connector suitable for connection with, for example, a laser radar is disclosed. The connector includes a power terminal for transmitting power and a signal terminal for transmitting signals. The connector further includes a connector sealing assembly, the inner housing 200, and cables 1,2,3. The connector sealing assembly includes the outer housing 100, the cable seals 110,120, and the housing seal 130. The inner housing 200 is at least partially accommodated in the outer housing 100. The cables 1,2,3 extend into the outer housing 100 and the inner housing 200 and pass through the cable seals 110,120.

A plurality of seal mounting portions 101*a*,102*a*,112*b* are provided inside the outer housing 100. The cable seals 110,120 are mounted on the cable seal mounting portions 101*a*,102*a* of the plurality of seal mounting portions 101*a*, 102*a*,112*b*, and are used to realize the sealing between the outer housing 100 and the cables 1,2,3 extending into the outer housing 100. The housing seal 130 is mounted on the housing seal mounting portion 112*b* of the plurality of seal mounting portions 101*a*,102*a*,112*b*, and is used to realize the sealing between the outer housing 100 and the mating housing of the mating connector.

Figure 5:
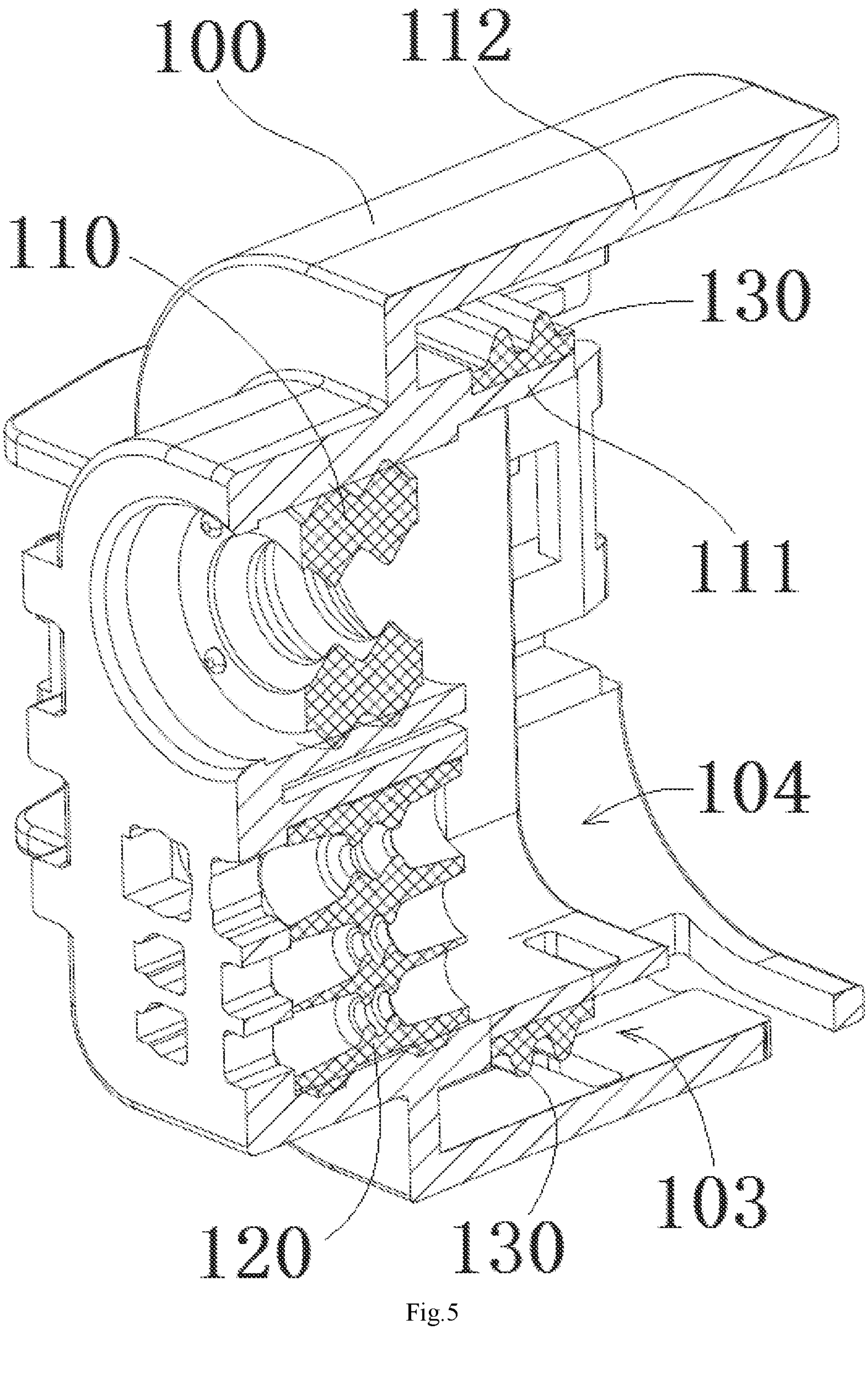
FIG. 5 shows an illustrative assembly view taken along the line 3-3 of an outer housing, a cable seal and a housing seal of the connector shown in FIG. 1.

FIG. 5 shows an illustrative assembly view of the outer housing 100, the cable seals 110, 120 and the housing seal 130 of the connector according to an exemplary embodiment of the present invention. Referring generally to FIGS. 1-5, the cable seals 110,120 are accommodated in the outer housing 100 to create a seal between the outer housing 100 and the cables 1,2,3 extending into the outer housing 100. The housing seal 130 is accommodated in the outer housing 100 for realize the sealing between the outer housing 100 and the mating housing of the mating connector. The first cable seal 110 is used to seal some cables 1 of the connector. The second cable seal 120 is used to seal other cables 2,3 of the connector.

A first accommodation chamber 101, a second accommodation chamber 102, and a third accommodation chamber 103 are formed in the outer housing 100. The first accommodation chamber 101 is used to accommodate or receive the first cable seal 110. The chamber wall of the first accommodation chamber 101 is sealingly engaged with the first cable seal 110. The second accommodation chamber 102 is used to accommodate the second cable seal 120. The chamber wall of the second accommodation chamber 102 is sealingly engaged with the second cable seal 120. The third accommodation chamber 103 is used to accommodate the housing seal 130. The first accommodation chamber 101, the second accommodation chamber 102 and the third accommodation chamber 103 are isolated from each other in the outer housing 100.

The connector sealing assembly further includes a protection end cap 40. The protection end cap 40 is inserted into an opening of the first accommodation chamber 101 and fixed to the outer housing 100, which is used to hold the first cable seal 110 in the first accommodation chamber 101 to prevent the first cable seal 110 from being pulled out of the first accommodation chamber 101.

The outer housing 100 includes an outer peripheral wall 111, an inner peripheral wall 112, and a radial side wall 113. The inner peripheral wall 112 is radially spaced from the outer peripheral wall 111. The radial side wall 113 is connected between one end of the outer peripheral wall 111 and the inner peripheral wall 112. The first accommodation chamber 101 and the second accommodation chamber 102 are surrounded by the inner peripheral wall 112 and isolated from each other. The third accommodation chamber 103 is defined between the outer peripheral wall 111, the inner peripheral wall 112 and the radial side wall 113. The housing seal 130 is provided on the outer side of the inner peripheral wall 112 and is sealingly engaged with the inner peripheral wall 112.

Still referring to FIGS. 1-5, a slot 112*a* is formed on the inner peripheral wall 112 of the outer housing 100. The slot 112*a* is adapted to engage with the protrusion 212*a* formed on the inner housing 200 of the connector to fix the inner housing 200 to the outer housing 100. The fixing feature between the outer housing 100 and the inner housing 200 is not limited to the illustrated embodiment, and other suitable features may be adopted.

The housing seal 130 is a seal ring and is fitted on the outer peripheral surface of the inner peripheral wall 112. The outer peripheral surface of the housing seal 130 is radially spaced apart from the inner peripheral surface of the outer peripheral wall 111 of the outer housing 100 by a predetermined gap to allow the mating housing of the mating connector to be inserted between the housing seal 130 and the outer peripheral wall 111 of the outer housing 100. In this way, the housing seal 130 is radially pressed between the mating housing of the mating connector and the outer peripheral wall 111 of the outer housing 100, thereby achieving a seal between them.

Figure 6:
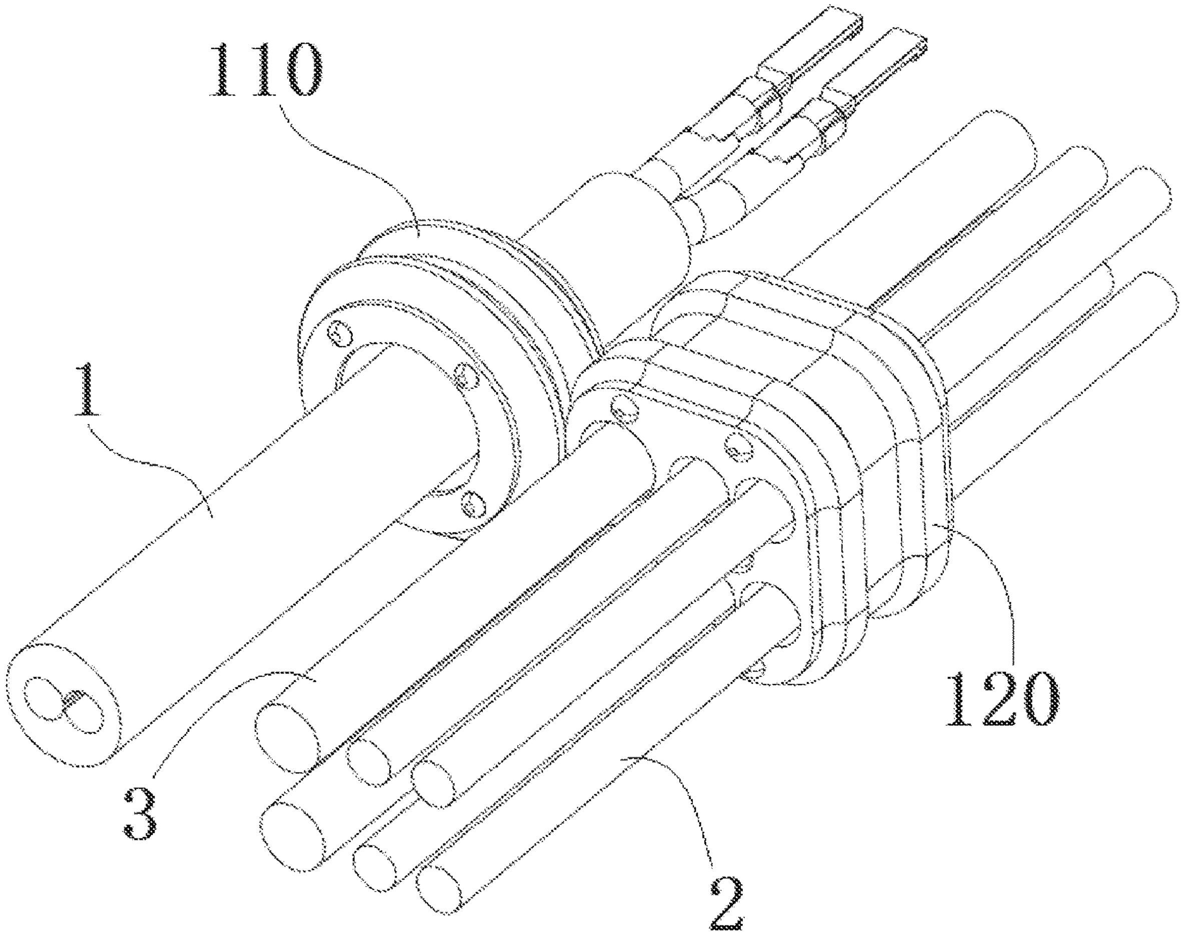
FIG. 6 shows an illustrative assembly view of a cable and a cable seal of the connector shown in FIG. 1.
Figure 7:
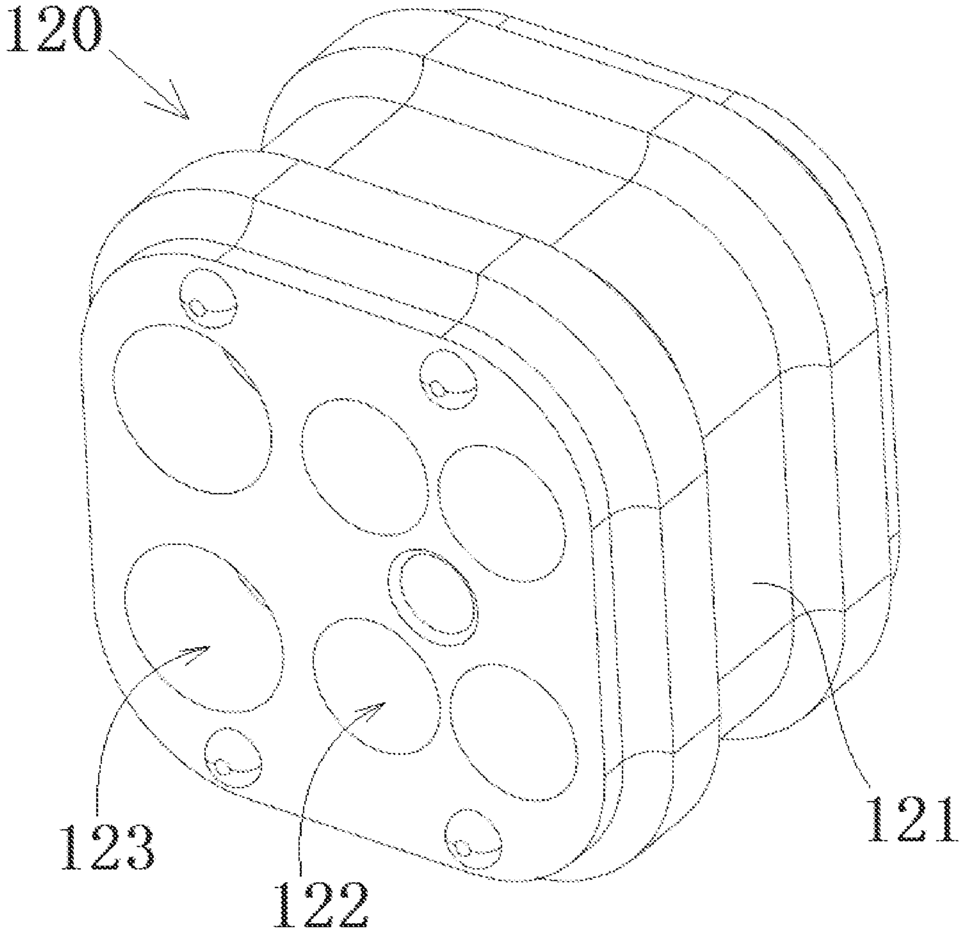
FIG. 7 shows an illustrative perspective view of the second cable seal shown in FIG. 6.

FIG. 6 shows an illustrative assembly view of the cables 1,2,3 and the cable seals 110, 120 of a connector according to an exemplary embodiment of the present invention. FIG. 7 shows an illustrative perspective view of the second cable seal 120 shown in FIG. 6. Referring to FIGS. 1-7, the cable seals 110,120 are adapted to simultaneously seal a plurality of different types and/or a plurality of different sizes of the cables 1,2,3. For example, a plurality of different cable through holes 122,123 may be formed in the cable seals 110,120, which are adapted to mate with a plurality of different types and/or a plurality of different sizes of the cables 1,2,3, respectively. At least two different cable through holes 122 and 123 are formed on at least one of the first cable seal 110 and the second cable seal 120 for mating with at least two different types and/or different sizes of the cables 2 and 3.

A connector according to an embodiment of the present disclosure includes the aforementioned connector sealing assembly, an inner housing 200 and the cables 1,2,3. The inner housing 200 is at least partially accommodated in the outer housing 100. The cables 1,2,3 extend into the outer housing 100 and the inner housing 200 and pass through the cable seals 110,120. The cables 1,2,3 include a signal cable 1,2 for transmitting signals and a power cable 3 for transmitting power. That is, the connector is a hybrid connector suitable for simultaneously transmitting signals and power. For example, the connector may be a hybrid connector for connecting with a laser radar. The first cable 1 is used to transmit a first signal, for example, an Ethernet signal. The second cable 2 is used for transmitting a second signal different from the first signal, for example, for transmitting a LAN signal. The third cable 3 is used to transmit power.

The connector further includes a first terminal 10, a second terminal 20 and a third terminal 30. The first terminal 10 is provided in the inner housing 200 and electrically connected to the first cable 1. The second terminal 20 is provided in the inner housing 200 and electrically connected to the second cable 2. The third terminal 30 is provided in the inner housing 200 and electrically connected to the third cable 3.

The first cable 1 is an Ethernet cable for transmitting Ethernet signals, and the connector further includes a shield 11 provided in the inner housing 200. The shield 11 is electrically connected to the shield layer of the first cable 1, and the first terminal 10 is at least partially accommodated in the shield 11. Thus, electromagnetic shielding can be provided for the first terminal 10 to prevent signal interference. The connector further comprises a pair of shield connecting spring pieces mounted on both sides of the inner housing 200 for electrically connecting the shield 11 of the connector and a mating shield of the mating connector.

The cable seals 110,120 include a first cable seal 110 and a second cable seal 120. A first cable through hole adapted to mate with the first cable 1 is formed in the first cable seal 110. A second cable through hole 122 adapted to mate with the second cable 2 and a third cable through hole 123 adapted to mate with the third cable 3 are formed in the second cable seal 120. The outer diameter of the first cable 1 is larger than that of the second cable 2 and the third cable 3, and the inner diameter of the first cable through hole is larger than that of the second cable through hole 122 and the third cable through hole 123. The outer diameter of the third cable 3 is larger than the outer diameter of the second cable 2, and the inner diameter of the third cable through hole 123 is larger than the inner diameter of the second cable through hole 122. The first cable seal 110 is a seal ring and is sleeved on the first cable 1. The second cable seal 120 includes a block shaped sealing body 121. The second cable through hole 122 and the third cable through hole 123 are formed in the sealing body 121.

A connector sealing assembly according to an embodiment of the present disclosure includes the outer housing 100. The outer housing 100 is provided with the first accommodation chamber 101 and the second accommodation chamber 102 for installing the first cable seal 110 and the second cable seal 120, respectively. The outer housing 100 includes the outer peripheral wall 111, and the chamber 104 is formed inside the outer peripheral wall 111 to accommodate the inner housing 200 of the connector. The outer housing 100 further includes the inner peripheral wall 112 radially spaced from the outer peripheral wall 111 to form a third accommodation chamber 103 for accommodating the housing seal 130, and the radial side wall 113 connected to the outer peripheral wall 111 and the inner peripheral wall 112. The outer housing 100 is formed as a single integral piece. A housing seal mounting portion 112*b* is formed on an outer wall surface of the inner peripheral wall 112 for mounting the housing seal 130. The inner wall surface of the inner peripheral wall 112 is formed with cable seal mounting portions 101*a* and 102*a* for mounting the first cable seal 110 and the second cable seal 120 respectively.

Although not shown, in an exemplary embodiment of the present invention, there is also disclosed a connector assembly including the aforementioned connector and a mating connector (not shown) adapted to mate with the aforementioned connector.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector sealing assembly of a connector, comprising:

an outer housing defining a plurality of seal mounting portions and including:

a first accommodation chamber receiving a first cable seal, a chamber wall of the first accommodation chamber is sealingly engaged with the first cable seal;

a second accommodation chamber receiving a second cable seal, a chamber wall of the second accommodation chamber is sealingly engaged with the second cable seal;

an outer peripheral wall;

an inner peripheral wall radially spaced from the outer peripheral wall and having a slot formed thereon, the slot sized and located to engage with a protrusion formed on an inner housing of the connector to fix the inner housing to the outer housing; and a radial side wall connected between the outer peripheral wall and the inner peripheral wall, the inner peripheral wall separating the first accommodation chamber from the second accommodation chamber;

a cable seal having the first and second cable seal and mounted on a cable seal mounting portion of the plurality of seal mounting portions of an inner wall surface of the inner peripheral wall, the first cable seal adapted to form a seal with a first group of cables of the connector and the second cable seal for sealing other cables of the connector, the cable seal sized and located to form a seal between the outer housing and a cable extending into the outer housing; and a housing seal mounted on a housing seal mounting portion of the plurality of seal mounting portions, a third accommodation chamber receiving the housing seal and defined by the outer peripheral wall, the inner peripheral wall and the radial side wall.

2. The connector sealing assembly according to claim 1, further comprising a protection end cap inserted into an opening of the first accommodation chamber and fixed to the outer housing, the end cap holding the first cable seal in the first accommodation chamber.

3. The connector sealing assembly according to claim 1, wherein the housing seal is provided on an outer side of the inner peripheral wall and is sealingly engaged with the inner peripheral wall.

4. The connector sealing assembly according to claim 1, wherein the housing seal is a seal ring sleeved on the outer peripheral surface of the inner peripheral wall, an outer peripheral surface of the housing seal is radially spaced apart from an inner peripheral surface of the outer peripheral wall by a predetermined gap.

5. The connector sealing assembly according to claim 1, wherein the cable seal is formed with a plurality of different cable through holes adapted to mate with a plurality of different sizes of cables.

6. A connector sealing assembly, comprising:

an outer housing in which a first accommodation chamber and a second accommodation chamber are formed and sized to receive a first cable seal and a second cable seal, respectively, the outer housing having:

an outer peripheral wall in which a chamber is formed and sized to receive an inner housing of a connector;

an inner peripheral wall radially spaced from the outer peripheral wall and forming a third accommodation chamber sized to receive a housing seal, the inner peripheral wall further having a slot formed thereon, the slot sized and located to engage with a protrusion formed on an inner housing of a connector to fix an inner housing to the outer housing; and a radial side wall connected between the outer peripheral wall and the inner peripheral wall; and a protection end cap inserted into an opening of the first accommodation chamber and fixed to the outer housing.

7. The connector sealing assembly according to claim 6, wherein a housing seal mounting portion for mounting the housing seal is formed on an outer wall surface of the inner peripheral wall.

8. The connector sealing assembly according to claim 6, wherein cable seal mounting portions for mounting a first cable seal and a second cable seal are formed on an inner wall surface of the inner peripheral wall.

9. A connector, comprising:

a connector sealing assembly, including:

an outer housing defining a plurality of seal mounting portions;

a cable extending into the outer housing and an inner housing and passing through a cable seal, the cable including:

a first cable adapted to transmit a first signal;

a second cable adapted to transmit a second signal different from the first signal; and a third cable adapted to transmit power, an outer diameter of the first cable is larger than an outer diameter of the second cable and the third cable, and an inner diameter of a first cable through hole is larger than an inner diameter of a second cable through hole and a third cable through hole, and the outer diameter of the third cable is larger than the outer diameter of the second cable, and the inner diameter of a third cable through hole is larger than the inner diameter of the second cable through hole;

the cable seal having a first cable seal and a second cable seal and mounted on the plurality of seal mounting portions, the cable seal including:

the first cable through hole adapted to mate with the first cable and formed in the first cable seal; and the second cable through hole adapted to mate with the second cable and the third cable through hole adapted to mate with the third cable are formed in the second cable seal; and a housing seal mounted on a housing seal mounting portion of the plurality of seal mounting portions; and the inner housing at least partially received within the outer housing;

a first terminal provided in the inner housing and electrically connected to the first cable;

a second terminal provided in the inner housing and electrically connected to the second cable;

a third terminal provided in the inner housing and electrically connected to the third cable; and a shield arranged in the inner housing, the first cable is an Ethernet cable for transmitting Ethernet signals, the shield is electrically connected to a shield layer of the first cable, and the first terminal is at least partially accommodated in the shield.

10. The connector according to claim 9, wherein the first cable seal is a seal ring and is sleeved on the first cable, and the second cable seal includes a block shaped sealing body in which the second cable through hole and the third cable through hole are formed.

* * * * *